UNITED STATES PATENT OFFICE.

JEHU BRAINERD, OF CLEVELAND, OHIO.

IMPROVEMENT IN TANNING.

Specification forming part of Letters Patent No. 33,182, dated September 3, 1861.

*To all whom it may concern:*

Be it known that I, JEHU BRAINERD, of Cleveland, in the county of Cuyahoga and State of Ohio, have invented certain new and useful Improvements in Tanning; and I do hereby declare that the following is a full and complete description of the same, together with the manipulations during the process.

The nature of my invention relates to the use of a certain species of willow, hereinafter named, which I am not aware has hitherto been used for the purpose of tanning.

The novelty of the process consists in the immersion of skins (previously prepared chemically in a bath of mineral salts) in a decoction of the said species of willow, whereby the process of tanning is much shortened as compared with the common mode, resulting in a more economical use of the tannin and the production of a superior quality of leather.

The chemical bath I prefer to use in the preparation of the skins is hereinafter described; but I do not in this declaration, nor in the specification following, intend to confine myself to it as a specialty, but to vary the same by the use of substantial equivalents to such an extent only as shall not change the distinctive features of my improvement. For example, the protochloride of iron may be substituted for the chloride of zinc, with this difference: the leather assumes in consequence thereof a dark-brown or black color.

The skins may be unhaired in any of the approved methods. Where lime alone is used the bating process may be resorted to. If sulphurets, hyposulphites, or sulphites of any of the metals or their oxides are used, a water bath may be a sufficient substitute for the bate. Whichever method is practiced, the skins must become soft and pliable and entirely free from any alkaline compounds, and before going into the chemical bath should be thoroughly worked upon the beam, both upon the flesh and grain sides, the latter surface being freed from the hair-glands. In this condition the skins are soft and flaccid, and are then ready for the next step.

My chemical bath, to the action of which the skins are next subjected, is prepared as follows: Take, say, one pound of pure hydrochloric acid in a glass or stone vessel much larger than is needed to hold the acid, and add metallic zinc till all effervescence ceases. Then add pulverized aloes to the decanted chloride of zinc, as much as it will freely dissolve. Take common salt, one pound; pulverized alum, one pound, and mix them dry, and add two ounces of the above-named zinc preparation, and thoroughly mix. A large quantity may be prepared in the same proportions, and kept ready for use.

In a suitable vessel or vat I prepare my chemical bath by dissolving at the rate of one pound of this mixture in three gallons of soft water. The skins unhaired and fitted as hereinbefore stated are now handled in this bath from two to six days, according to the thickness of the skin. They here undergo a marked chemical change, assuming a pale cream color and leathery feel. A workman will soon become familiar with its precise character, and will thus be enabled to judge when the action of this bath is completed. This solution must be strengthened from time to time as may be required to produce the desired result. It will keep good for any length of time. When the skins are taken from this bath they should be worked off upon the beam and pated—that is, the thicker parts shaved off—so that the skins shall present nearly a uniform thickness. They should then be soaked in soft water for at least twenty-four hours, and again worked upon the beam, and they are ready for tanning. I now take the boughs of the *Salix grisea*, (*S. petiolaris* of Lindley, the *S. fuscata* of Pursh, also figured and described by Rind in his "Vegetable Kingdom,") from which I make a decoction in any convenient manner, and similar to that practiced in obtaining a decoction of tannin from bark. When this decoction is cold the skins prepared as above are immersed therein and thoroughly handled for several hours in order to get an even color to the grain, for the action is very rapid. This decoction should be renewed daily till the skins are thoroughly tanned, which for calf-skins will require from eight to ten days. The spent tan-liquor may be used instead of water in making up a new decoction. When the skins are thoroughly tanned they should be scoured in soft water and finished in the usual manner.

In gathering and preparing the *Salix grisea* it is important that the shrub be crushed between hard rollers, or by bruising, and if not used immediately the leaves and crushed branches should be thoroughly dried. If the branches and leaves are suffered to dry without crushing, the bark, and to a considerable extent the leaves, lose their tanning properties. The bark on the wood, the wood itself, and leaves become black, and a decoction of such, while it contains but little tannin, gives the skins a dark and dirty color; but when used fresh or in a dry state, prepared as above by crushing and quick drying, the skins have a very fair and beautiful color and a remarkably soft texture. The wood, when first cut and crushed, is very white, and it is a matter of economy to strip the larger branches after they have passed between the rollers, as the wood absorbs the tannin when subjected to the action of hot water in obtaining the decoction, as is shown by the change of color and astringent taste of the wood.

A further advantage will be obtained in grinding the dried bark and leaves before making the decoction.

When plants containing much herbaceous matter—for example, the leaves of shrubs and trees—are used for tanning purposes there is in the common method of using the decoction so strong a tendency to fermentation and decomposition and the consequent loss of tannin that the use of such decoctions alone is exceedingly difficult; but by my improved mode of use this difficulty does not prevail, for the process is so rapid that fermentation cannot take place before the liquor becomes exhausted of its tannin.

The solution of the herein-named salts may be used mixed with the decoction of *Salix grisea*, and thus to a limited extent the herein-described benefits obtained, the chemical change produced thereby taking place simultaneously with the tanning, but with much loss of the tanning principle, for in such cases the spent liquor cannot be used for a new decoction.

Soft water should in all cases be used in all the processes of tanning.

I am aware that some of the species of the willow have been used for tanning purposes; but I am not aware that the species herein named has been in any manner previously used, and especially in the combination herein set forth. Therefore

What I claim as my improvement, and desire to secure by Letters Patent, is—

The immersion of skins, prepared as herein set forth, in a decoction of *Salix grisea*, as and for the purpose specified.

JEHU BRAINERD.

Witnesses:
EDM. E. BROWN,
J. B. LOOMIS.